United States Patent

[11] 3,599,699

[72] Inventor Irvin E. Middleton, Jr.
 Akron, Ohio
[21] Appl. No. 32,798
[22] Filed Apr. 29, 1970
[45] Patented Aug. 17, 1971
[73] Assignee The General Tire & Rubber Company

[54] VERTICALLY SUSPENDABLE MOUNT TUBE
 10 Claims, 5 Drawing Figs.
[52] U.S. Cl. ................................................. 157/1.21
[51] Int. Cl. ................................................. B60c 25/12
[50] Field of Search .................................... 157/1.21; 152/350

[56] References Cited
 UNITED STATES PATENTS
| | | | |
|---|---|---|---|
| 2,712,339 | 7/1955 | Hurt | 152/350 |
| 2,766,006 | 10/1956 | Kraft | 157/1.21 X |
| 2,873,796 | 2/1959 | Riley | 157/1.21 |
| 3,343,583 | 9/1967 | Plunk | 157/1.21 |

Primary Examiner—Granville Y. Custer, Jr.
Attorneys—Frank C. Rote, Jr. and Harry F. Pepper, Jr.

ABSTRACT: The difficult tasks of spreading the bead portions of pneumatic tire casings to mount the casings on rims, insert inner tubes, etc. are facilitated through use of a ringlike inflatable elastomeric diaphragm adapted to forcibly engage the periphery of the tire. Such a diaphragm is more conveniently operated while positioned along a vertical axis. For additional convenience and efficiency, it is desirable to suspend such diaphragm from overhead, for easy movement downwardly to an operating position, and upwardly to a storage position. In order to structurally adapt these diaphragms for vertical suspension, support means are built into or made a structural part of the diaphragm. The support means are preferably a plurality of spaced support loops disposed about the periphery of the diaphragm and anchored within the outer wall thereof.

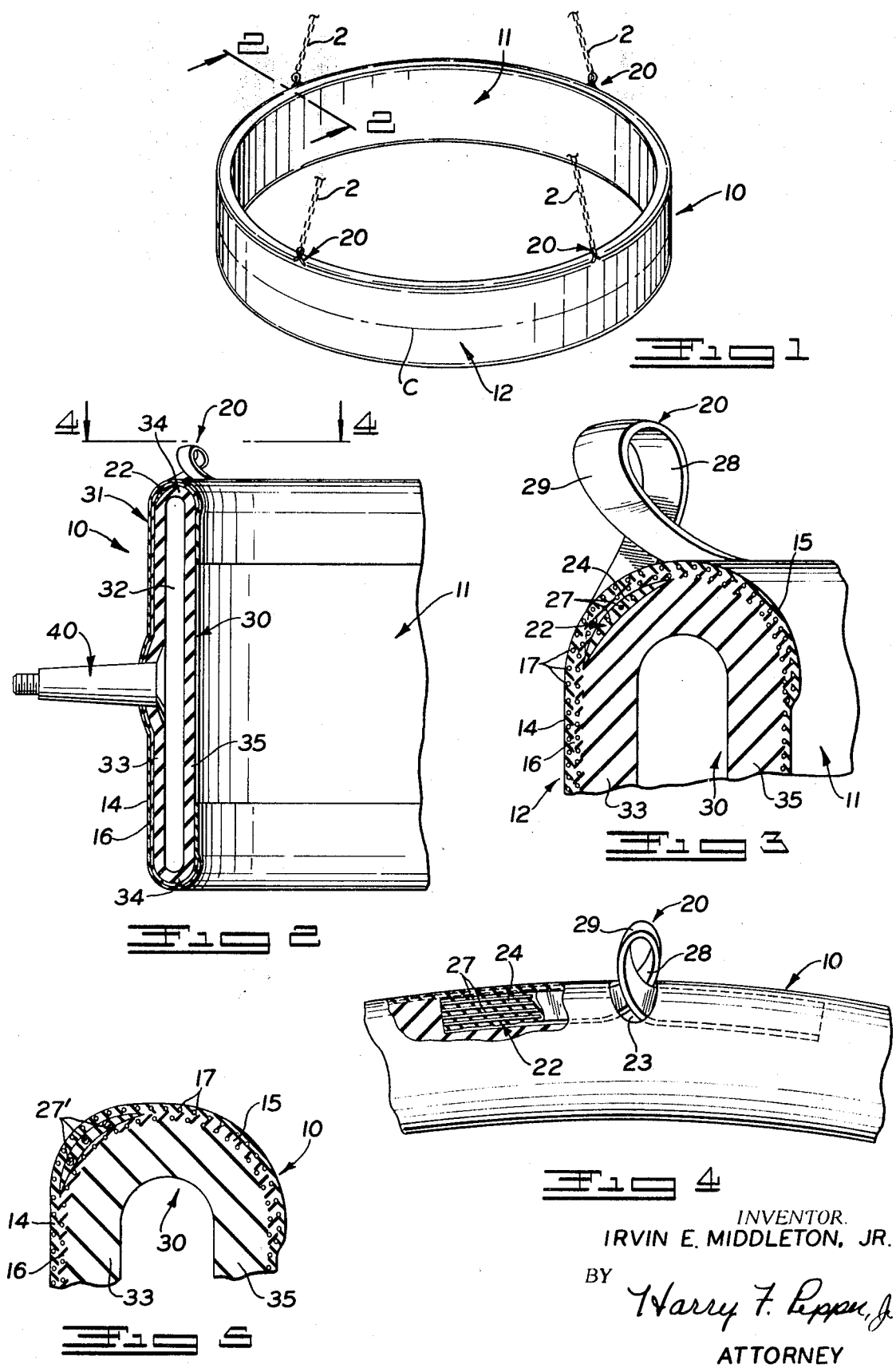

VERTICALLY SUSPENDABLE MOUNT TUBE

BACKGROUND OF THE INVENTION

THe invention relates to a diaphragm bead spreader or mount tube of the type described in U.S. Pat. No. 2,766,006 and U.S. Pat. application, Ser. No. 873,876 filed Nov. 4, 1969, both assigned to the present assignee, and in particular, relates to improvements in such diaphragms.

Articles of the type described in the aforementioned patent and application are generally in the form of an inflatable ringlike tubular member having a radially inner, flexible or extensible wall and a radially outer, substantially inextensible or restrained wall. In operation, the tubular member is placed around the tread area of a pneumatic tire casing with the radially inner wall thereof adjacent the tread portion, and inflated. Upon inflation the radially inner wall of the mount tube engages the tread of the casing and further inflation coupled with further extension of the radially inner wall of the mount tube forces the tire casing to spread in an axial direction. These tubular members are particularly useful in facilitating seating the bead portions of a tubeless tire on a rim. Continued use of these tubular members for such purposes has resulted in such members being frequently referred to as "mount tubes."

Mount tubes may be of several designs. For example, in the aforementioned U.S. Pat. No. 2,766,006 two general types of mount tubes are disclosed. There is the type which can be mounted on a wall and within which the tire casing is placed with its axis generally horizontal. A second, more portable, mount tube is also disclosed in which the tube may be placed either on the floor or on a support extending from the floor wherein the tire casing is fitted within the tube with its axis generally in a vertical direction. Of these two types of mount tubes the latter has appeared to have gained wider acceptance probably due to its versatility. Also, since an important function of these mount tubes is the mounting of tubeless-type tire casings on rims this operation is more easily performed when the tire casing is disposed with its axis in a vertical direction.

Recent innovations have provided auxiliary equipment for use with mount tubes wherein the tubes may be vertically suspended for manipulation from an overhead support. In principle, these developments combine the preferred vertical axis positioning of the tube, with easy storage of and access to the tube itself. The vertical suspension or support of the tube is presently achieved by providing a circular metal ring in which the tube itself is placed, with the ring suspended by chains or other suitable suspending means from an overhead reel. The ring and tube is thus raised and lowered with respect to a ground support holding the tire and rim about a vertical axis.

It has been found that while the convenience and efficiency of these suspended units are quite significant, the unit or machine by which the tube is suspended has added substantially to the general expense or cost involved. It has been suggested that if the metal ring within which the tube is placed could be omitted, the expense of utilizing a vertically suspended mount tube would be substantially reduced.

SUMMARY OF THE INVENTION

It is an object of the present invention to provide an improved mount tube or diaphragm bead spreader of the type which operates upon a pneumatic tire casing having its axis disposed in a vertical direction.

It is another object of the present invention to provide a mount tube suspendible from overhead, with means for supporting said tube from overhead built into, or made an integral part of, the tube itself.

It is a further object of the present invention to provide a ringlike inflatable mount tube having an inner flexible annular wall and an outer restrained annular wall with a plurality of support loops anchored to and extending from said outer annular wall.

The mount tube according to the present invention includes, along the outer periphery thereof, a plurality of equally spaced support loops which have been cured, vulcanized or otherwise made integral with the tube itself. The basic tube design is conventional, and includes a radially inner annular wall which will extend or flex upon inflation and an outer annular wall restrained against any such flexure or extension. The restraint on the outer annular wall of the tube is typically provided by a restraining layer formed of rubberized plies or cord fabric. The support loops are added by curing or vulcanizing into the radially outer wall a plurality of strips of rubberized cords which have been looped along the center thereof. The strips are composed of at least two cords embedded in elastomeric material and are preferably nylon or metallic.

PREFERRED DESCRIPTION OF THE DRAWINGS

FIG. 1 is a representation of a mount tube constructed according to the present invention as it might appear suspended, with certain parts of the suspension system being omitted.

FIG. 2 is an enlarged radial cross-sectional view through the walls of a portion of the mount tube taken along the lines 2-2 of FIG. 1.

FIG. 3 is a further enlarged view of a portion of FIG. 2, and in particular, the upper or supported end of FIG. 2.

FIG. 4 is a view taken along the lines 4-4 in FIG. 2 with certain portions shown in section and omitted.

FIG. 5 is a view similar to FIG. 3 showing a modification according to the present invention.

DESCRIPTION OF PREFERRED EMBODIMENTS

In FIG. 1, a diaphragm spreader or mount tube 10 is illustrated as suspended on a plurality of chainlike members 2 each connected to a support loop 20 provided on the mount tube 10. The mount tube 10 includes a radially inner flexible or extensible surface 11 and a radially outer inextensible or restrained surface 12. The diaphragm 10 has an annular or ringlike contour and is made in a range of sizes with the inner diameter being such in a selected size that the mount tube will fit about the surface of a selected range of tire sizes.

Referring to FIG. 2 the mount tube 10 includes a main core or body member which is an elastomeric tube or bladder 30, defining an airtight inner cavity 32. A valve fitting 40 registers with cavity 32 through the radially outer wall 33 of the tube 30. The mount tube 10 is inflated through valve fitting 40. However, only the inner surface 11, a major portion of which is the surface of the inner wall 35 of tube 30 extends upon inflation. Tube or bladder 30 is made of a typical elastomeric composition with air retention properties such as those compositions used in tire inner tubes and the like. The respective thicknesses of outer wall 33 and inner wall 35 are parameters dependent upon situations in which the tube 10 is used. The inner and outer walls 35 and 33 respectively are shown to be of equal thickness, however, they may be of different thickness if desired.

The radially outer surface or wall 12 of the tube 10 includes the outer wall 33 of tube 30 and a restraining layer or band 31 composed of a pair of cord reinforced elastomeric plies 14 and 16. The plies 14 and 16 coextend annularly with the outer wall 33 of the tube 30. The outer ply 14 is shown to be slightly wider than the inner ply 16 with both plies extending around the marginal edges or corners 34 of the tube 30 and terminating inwardly of these corners along the inner surface 11 of the mount tube 10.

As seen in FIG. 3, the plies are composed of a suitable elastomeric compound 15 reinforced by spaced mutually parallel cords 17. The plies 14 and 16 are essentially similar to the bias cut plies used in pneumatic tire carcass construction. The cords 17 may be composed of any of the suitable "textile-type" materials commonly used as tire ply cores, such as cotton, rayon, polyester, or glass. Nylon is preferably not used because of its tendency to shrink and flex under extreme changes in temperature. This tendency could have an adverse effect on the dimensions of the tube 10, which desirably should remain substantially constant. Metal cables or wires are also suitable material candidates for cords 17. The cords 17 are preferably disposed to lie at an acute angle relative to the circumferential centerline of the mount tube 10 indicated generally as the line C in FIG. 1. Also, for purposes of balance, the cords 17 in ply 16 should extend in an opposite direction relative to the direction of cords 17 in ply 14. In other words, the cords in a given ply such as 16 are to cross the cords in an adjacent ply such as 14. The construction specifically shows the outer layer 31 composed to two plies; however, any number of plies may be used. When using additional plies, it is preferred that the total number of plies is an even number, again for purposes of balance.

The inner wall 33 forming a substantial portion of the inner surface 11 of the tube member 10 may be provided with a cord reinforced elastomeric ply as described and claimed in the aforementioned U.S. Pat. application, Ser. No. 873,876. Such an additional ply is normally disposed when the mount tube 10 is used in connection with larger size pneumatic tires. However, for the sake of simplicity, a showing of an additional ply along the inner surface 11 is omitted.

Referring to FIG. 2, inflation fluid entering valve stem or fitting 40 moves the radially inner surface 11 inwardly for engagement with the tread of a pneumatic tire placed within the tube 10. This action will spread the bead portions of the tire in a manner more fully explained in the aforementioned U.S. Pat. No. 2,766,006 and U.S. Pat. application, Ser. No. 873,876.

The immediately foregoing description relating to the basic mount tube structure is somewhat conventional and for purposes of the instant invention includes the details mentioned, and in addition the details described and suggested in the aforementioned patent and application.

According to the instant invention, the tube 10 is provided with a plurality of support loops 20 equally spaced along the upper side of and extending from the radially outer surface 12 as seen in FIG. 1. Referring to FIGS. 2, 3 and 4, each loop 20 is formed by looping the center portion of a strip 22 of cord reinforced ply stock, with the end portions of the strip cured or vulcanized within the radially outer surface 12 of the mount tube 10. The strip 22 is composed of typical elastomeric or "-skim" compound 24 and a number of spaced substantially mutually parallel reinforcing cords 27 and may be cut from sheets of typical calendered ply stock of the type used in tires. In FIGS. 2 and 3 the anchoring or end portions of the looped strip 22 are shown disposed between the interface of the radially outer wall 33 of tube 30 and the innermost restraining ply 16. The cords 27 are preferably nylon, but may also be metallic cables. Thus, for purposes of this invention "cords" when used to refer to members 27 of the strip 24 are to include both the textile-type material such as nylon, and wire or metallic cables. It is preferred that at least two cords 27 be used to form each loop 20. In the case of nylon, four cords are found highly suitable, while three metal cables are sufficient.

When using a strip 24 reinforced with nylon cords 27 it is preferred that the anchoring or end portions of the strip be disposed as shown in FIG 3, e.g., between the interface of the tube wall 33 and the inner restraining ply 16. When the cord members of the strip 24 are wire or metallic cables, represented as 27' in FIG. 5, it is preferred that the anchoring or end portions of the strip be disposed between the two plies 14 and 16. This alternate disposition shown in FIG. 5 is to prevent the wires or cables 27' from tearing portions of the tube 30, as might occur in the case of wire.

The number of loops 20 or looped strips 22 provided to vertically suspend the mount tube 10 can be any number found best suited to the operating conditions under which the tube 10 is used. For example, if the mount tube 10 is of relatively large diameter, it might be desirable to provide more than four loops as is shown in FIG 1. It is preferred, however that at least three loops be used to properly balance the tube 10 in its vertically suspended state. As stated previously, the loops 20 are substantially equidistantly spaced about the periphery of the tube 10. However, this may not be possible in cases of unusual operating circumstances.

In order to properly anchor the looped strips 24 in the mount tube 10 it is preferred that the strip be inserted prior to the final cure or vulcanization of the mount tube 10. Since the looped center portion of the strip 22 is to extend from the wall, it is necessary that steps be taken to prevent this portion from curing together or to the mount tube wall. One way in which this is accomplished is by first looping the strips generally along the center portions thereof and inserting the strips against the outer surface of radially outer wall 33 as shown in FIG. 3, or between the plies 14 and 16 as shown in FIG 5, prior to the final mount tube cure. Then using a proper tool such as an awl, holes may be punched through the outer ply 14 such as indicated at 23 in FIG. 4. Another tool can be used to pull the looped portion 20 outwardly through the restraining layer or band as generally represented in FIG. 4. The loops should extend at least about 1 inch from the outer surface 12 of the mount tube. The loops 20 may then be treated to prevent them from curing together or to the side of the mount tube. For example, Holland cloth may be put along the inside surface 28 and along the outside surface 29 of each loop 20 thereby preventing this curing. After covering the loops 20 with Holland cloth the entire article is cured in a conventional mold for this purpose and when removed from the mold the Holland cloth protection is removed. There are, of course, other ways or steps which may be taken to prevent the curing of the loops to the tube such as using silicone or a sulfur cure butyl cement on the looped portion 20 of each strip 22.

It is stated above that the reinforcing or restraining plies 14 and 16 may include conventional cord-type reinforcement including wire cables. Best results are obtained when each of the restraining plies 14 and 16 include glass cord reinforcement. The glass cords are strong enough to hold the tube in a substantially circular form, particularly when suspended. While wire cables are likely to also offer this advantage, wire could add additional, and sometimes undesirable, weight. Other textile-type reinforcing cords such as rayon or polyester, while suitable, tend to permit the tube to take a somewhat elliptical shape when suspended.

While the loops 20 are shown each formed from a separate strip 22 of conventional ply stock, it is also possible that each loop 20 be formed out of a single more elongated strip. In other words, an annular strip of cord reinforced ply stock could be made with several equally spaced loops. The strip could then be applied around the tube 30 and each of the several loops pulled through the restraining layer or band 31 as described above.

While the foregoing relates to the mount tube constructed according to preferred embodiments, it is of course possible to depart from the specific details shown by obvious modifications. For example, the particular positioning of the loop members 20 might be changed somewhat without departure from the scope of the invention. Also, modification to the structure of the mount tube 10 itself can be made by one skilled in the art without departing from the inventive concept. Thus, the invention as herein described is to be measured by the appended claims.

What I claim is:

1. A inflatable, tubular ring of vulcanized elastomeric material used to spread apart pneumatic tire casings comprising A. an inner, radially movable, annular wall for engaging the tread portion of a pneumatic tire casing
   B. an outer, radially restrained, annular wall, and
   C. at least three support loops
      1. spaced equidistantly along the periphery of said ring, each of said loops
         a. being anchored to and
         b. extending from said outer, radially restrained wall
      whereby said ring may be suspended from overhead.

2. The invention as defined in claim 1 wherein each of said support loops comprises a looped strip of cord reinforced elastomeric material, the ends of said strip being disposed within said outer annular wall.

3. The invention as defined in claim 2 wherein the cord reinforcement of said strip comprises at least two mutually parallel nylon cords.

4. The invention as defined in claim 2 wherein the cord reinforcement of said strip comprises at least two mutually parallel metallic cables.

5. An annular, inflatable diaphragm for forcibly engaging the tread portion of pneumatic tire casings to thereby spread said casing comprising
   A. an inflatable ringlike tube of elastomeric material having
      1. a radially inner annular wall, and
      2. a radially outer annular wall
   B. an annular restraining layer along the outer surface of the radially outer wall of said tube, said layer comprising
      1. an even number of elastomeric plies reinforced with spaced substantially mutually parallel cords disposed at an acute angle relative to the circumferential centerline of said diaphragm, and
   C. at least three support loops
      1. spaced equidistantly along the periphery of said diaphragm, each of said loops
         a. being anchored to and
         b. extending from said annular restraining layer.

6. The invention as defined in claim 5 wherein each of said loops comprises a looped strip of cord reinforced elastomeric material, the end portions of said strip being disposed within said annular restraining layer.

7. The invention as defined in claim 6 wherein the cord reinforcement of each of said strips comprises at least two substantially mutually parallel nylon cords.

8. The invention as defined in claim 7 wherein said end portions of each of said strips are disposed between the interface of said restraining layer and the outer surface of said radially outer annular wall of said tube.

9. The invention as defined in claim 6 wherein the cord reinforcement of each of said strips comprises at least two substantially mutually parallel metallic cables.

10. The invention as defined in claim 9 wherein said end portions of each of said strips are disposed between two adjacent elastomeric plies of said annular restraining layer.